United States Patent
Ben-Artzi et al.

(10) Patent No.: US 8,386,487 B1
(45) Date of Patent: Feb. 26, 2013

(54) CLUSTERING INTERNET MESSAGES (75) Inventors: Aner Ben-Artzi, Los Angeles, CA (US); Kirill Buryak, Sunnyvale, CA (US); Glenn M. Lewis, Costa Mesa, CA (US); Jun Peng, San Ramon, CA (US); Nadav Benbarak, Mountain View, CA (US)

(73) Assignee: Google Inc., Mountain View, CA (US)

( * ) Notice: Subject to any disclaimer, the term of this patent is extended or adjusted under 35 U.S.C. 154(b) by 165 days.

(21) Appl. No.: 12/940,917

(22) Filed: Nov. 5, 2010

(51) Int. Cl.
*G06F 17/30* (2006.01)
(52) U.S. Cl. ........................................ 707/737
(58) Field of Classification Search .................. 707/205, 707/738, 740, 737; 379/93.23
See application file for complete search history.

(56) References Cited

U.S. PATENT DOCUMENTS

| | | | |
|---|---|---|---|
| 7,899,871 B1 * | 3/2011 | Kumar et al. ................ | 709/206 |
| 2001/0032170 A1 * | 10/2001 | Sheth ............................. | 705/37 |
| 2006/0101102 A1 * | 5/2006 | Su et al. ........................ | 707/205 |
| 2009/0323912 A1 * | 12/2009 | Toner et al. ................. | 379/93.23 |
| 2010/0161611 A1 * | 6/2010 | Guo et al. ..................... | 707/738 |
| 2010/0211428 A1 * | 8/2010 | Duffy et al. ....................... | 705/9 |
| 2012/0041955 A1 * | 2/2012 | Regev et al. .................. | 707/740 |

* cited by examiner

*Primary Examiner* — Etienne Leroux
(74) *Attorney, Agent, or Firm* — Armstrong Teasdale LLP (57) ABSTRACT

Among other disclosed subject matter, a computer-method includes receiving a plurality of documents at a server and adding meta-data to each of the plurality of documents. The meta-data added to a particular document comprises at least one of task flow features of the particular document or data associated with an author of the particular document. The method also includes selecting a plurality of features for use in clustering the plurality of documents. The plurality of features includes a subset of the meta-data and a subset of content associated with one or more of the plurality of documents. The method also includes clustering the plurality of documents based on the plurality of features including identifying a topic associated with each cluster, and preparing a report based on the clusters and metric information associated with each cluster. The method also includes displaying the report to a user.

27 Claims, 4 Drawing Sheets

CLUSTERING INTERNET MESSAGES

BACKGROUND

This document relates to information presentation.

The Internet provides access to a wide variety of resources, including customer support webpages, online support forums, troubleshooting guides and articles related to issues experienced by users of the internet or products/services. These resources can be provided by a merchant, a service provider and/or other organization to allow its customers, clients, users and/or other individuals to raise questions or issues, such as questions or issues related to complaints, billing problems and/or troubleshooting, directly with the merchant/service provider.

SUMMARY

This document describes techniques for clustering Internet documents.

In one aspect, a computer-implemented method includes receiving a plurality of documents and adding meta-data to each of the plurality of documents. The meta-data added to a particular document comprises at least one of task flow features of the particular document or data associated with an author of the particular document. The method also includes selecting a plurality of features for use in clustering the plurality of documents. The plurality of features includes a subset of the meta-data and a subset of content associated with one or more of the plurality of documents. The method also includes clustering the plurality of documents based on the plurality of features including identifying a topic associated with each cluster, and preparing a report based on the clusters and metric information associated with each cluster. The method also includes displaying the report to a user.

Particular aspects of the subject matter described can be implemented to realize none, one or more of the following advantages. Messages can be collected and analyzed to provide an understanding of the issues a company's customers/clients/users are facing.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Systems and methods are described for clustering Internet documents, such as emails, bug tracking entries, and/or help desk messages. A message handling system receives messages and meta-data is added to the messages. The meta-data can include data associated with the author/sender of the message, such as the author's name, websites the author recently visited, search queries recently performed by the author and the relationship the author has with recipient of the message (e.g., a client, potential client). The meta-data can also include data associated with workflow queues that the message has passed through, data associated with customer service representatives that have viewed or handled the message and/or labels associated with the messages. The message handling system can cluster the messages based on a set of features that include the content of the message and/or the meta-data associated with the message to identify topics included in the messages. A label identifying the topic is associated with each cluster and a report is generated based on the topics/clusters.

Advantageously, the described system can provide one or more benefits, such as providing a company with an understanding of the issues its customers/clients/users are facing. In addition, the company can gain an appreciation of the areas in which it can improve customer relationships and/or improve its products, services and/or interactions with its customers/clients/users.

The systems discussed here may provide one or more mechanisms for collecting information about users. Users may be provided with an opportunity to opt in/out of programs that may collect personalized information. In addition, certain data may be anonymized in one or more ways before it is stored or used, so that personal data is removed. Data can also be aggregated or filtered to remove some or all personal data.

Figure 1:
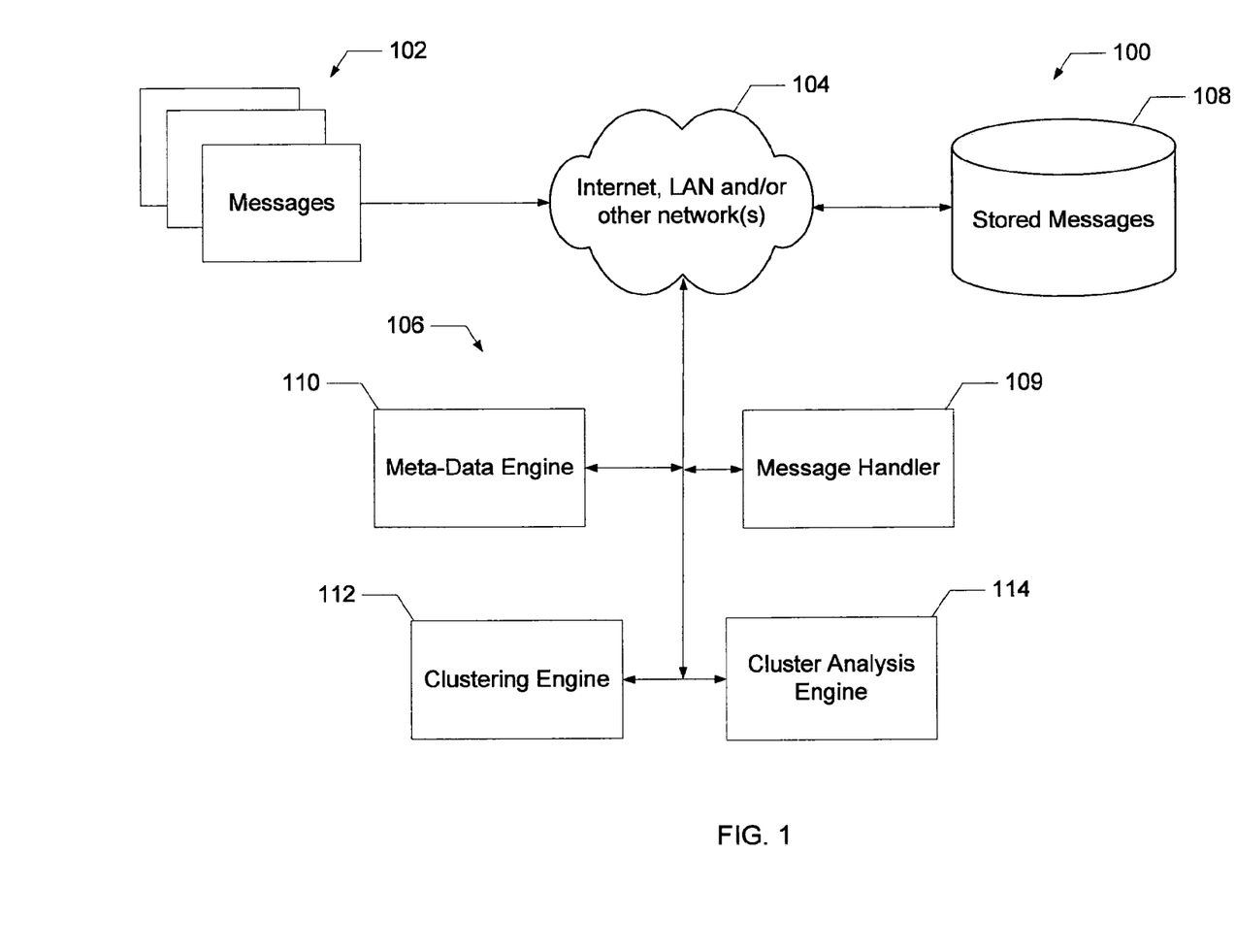
FIG. 1 is a block diagram of an example environment in which a message handling system generates cluster information and a report based on the cluster information.

FIG. 1 is a block diagram of an example environment 100 in which a message handling system generates cluster information and a report based on the cluster information. The environment 100 includes a plurality of messages 102, a network 104, a message handling system 106 and a database of stored messages 108.

The plurality of messages 102 can be any type of message. Example messages 102 can include HTML forms, email messages, comments to an article or website, online forum posts/entries, word processing documents, bug tracking messages/documents, help desk messages, portable document format (PDF) documents and/or other types of documents. The messages 102 can be provided to the message handling system 106 or accessed by a computer program or device that can access the messages. For example, a web crawling application can access comments to an article or online forum posts and store copies of the messages. In some implementations, the messages 102 can be stored in a database of stored messages 108. The database 108 can be any type of database or memory that can store the messages 108. While reference is made throughout the document to messages, other forms of documents can be received and/or accessed by the message handling system 106.

The network 104 can be any type of network such as a local area network (LAN), wide area network (WAN), the Internet, or a combination thereof. The network 104 facilitates connectivity between the messages 102, the message handling system 106, and the database of stored resources 108.

The message handling system 106 includes a message handler 109, a meta-data engine 110, a clustering engine 112 and a cluster analysis engine 114. The message handler 109 can receive the messages 102 from the network 104 and/or a server or access the messages 102 stored in the database of stored messages 108 and route the messages 102 to various users of the message handling system 106. For example, the message handler 109 can determine a message 102 relates to a particular product or service and route the message 102 to a person or group of persons that are assigned to handle messages related to the particular product or service (i.e., a support team), such as a product team or a support team. Example support teams include risk prevention teams, customer/client retention teams, billing support teams, and/or user privacy teams. In some implementations, the person or support teams can use the message handler 109 to route the message 102 to a different person within the support team or to a different support team. For example, if the person initially assigned to handle the message determines that another person or team should be assigned to handle the message, the person can use the message handler 109 to route the message to the other person/team. In some implementations, after a person or team indicates that the issue identified in a message is resolved or should be closed, the message handler 109 can route messages 102 to the database 108.

The meta-data engine 110 can add meta-data to a message 102. Various types of meta-data can be added to a message 102. For example, meta-data related to the author/sender of the message 102 can be added. Author/sender meta-data can include data associated with the identity of the author/sender of the message 102, information associated with user data (e.g., recently viewed web sites and/or support documents), and/or data associated with search queries previously executed by the author/sender. In some implementations, the user data and previously executed search queries can be provided by cookies or other internet tracking mechanisms that reside on the author/sender's computer or internet connected device. In some implementations, the author/sender meta-data can include data associated with the relationship between the author/sender and the recipient of the message (e.g., whether the author is a client/customer of the recipient, and/or the length of the relationship), previous issues associated with the author/sender, and/or fiscal information (e.g., amount of revenue attributed to the client/customer or the potential of generating revenue from the client/customer). The fiscal information and/or the relationship information can be provided by a customer relationship management system or a customer database.

The meta-data engine 110 can also add meta-data related to task flow features. Task flow features can include data associated with a person or support team that reviewed or interacted with the message (i.e., a workflow queue information), task information (e.g., intake processing information, status information, information related to a proposed resolution of the issue, the date the message was received, the date the message was transferred, the date the message was closed and/or notes entered by a customer service representative handling the message), or labels or keywords associated with the message (e.g., labels that describe the product and/or service identified in the message, labels that identify the issue raised by the message, and/or labels that describe the solution).

In some implementations, the message handler 109 automatically invokes the meta-data engine 110 to add the task flow meta-data as the message handler 109 receives a message 102 and/or routes a message 102 to a person or support team. For example, the message handler 109 can cause the meta-data engine 110 to add the name of a customer service representative that receives the message, the date the message was received or transferred and can add the status of the message (e.g., the length of time the message has been pending and/or unresolved) as meta-data. In some implementations, the persons handling or interacting with the message can use the meta-data engine 110 to add the meta-data. For example, a customer service representative can use the meta-data engine 110 to add notes related to an investigation the customer service representative performed while handling the message. The meta-data can be stored with the message 102 in the database 108.

The clustering engine 112 can access the database 108 and cluster the messages to identify topics included in the messages 102. For example, messages associated with billing issues can include topics such as overcharges, incorrect billing information and/or payment plans. Various clustering algorithms can be used by the clustering engine 112. For example, the clustering engine 112 can use a distributed exchange algorithm to cluster the set of relevant resources and identify the topics included in the set of relevant resources.

The clustering engine 112 can use various features of the messages as the basis for forming the clusters. For example, the features can include the meta-data associated with the messages and the content of the messages, such as the title, numbers, words, and/or phrases included in the messages. In some implementations, an information retrieval/text mining algorithm, such as a term frequency-inverse document frequency algorithm, is applied to the messages 102 to identify the features to be the basis for forming clusters. In some implementations, the clustering engine 112 attempts to group the set of relevant resources in various groupings until an optimal or near optimal grouping is identified. Typically, the messages contained in an optimal or near optimal grouping are all messages that are related to or describe a similar topic.

In some implementations, the clustering engine 112 can be used to identify subsets of the meta-data that should be selected as a basis for the clustering algorithm. For example, the clustering engine 112 can select particular items of meta-data that should be included as a feature for clustering, such as meta-data associated with the person handling or interacting with the message. The particular items of meta-data that are selected to be a basis for clustering can vary depending on the user of the clustering engine 112 and the information the user is interested in obtaining. In addition, the clustering engine 112 can be used to identify subsets of the meta-data that should not be selected by the clustering engine 112 as a basis for clustering (i.e., black listed items). For example, a user of the clustering engine 112 can specify that status of the message is a black listed item. As a result, the status of the message will not be selected as a basis to form clusters. The particular items of meta-data that are black listed can vary depending on the user of the clustering engine 112 and the information the user of the clustering engine 112 is interested in. In addition to the meta-data, particular content items included in the message, such as particular numbers, words or phrases, can be identified as being a basis for the clustering algorithm or can be identified as a black listed item.

The cluster analysis engine 114 can receive the clusters of messages generated by the clustering engine 110 and analyze the messages contained in each cluster to identify a label/descriptor to be associated with each cluster. The label/descriptor can be any type of token, word, phrase, sentence, or a combination of features. In some implementations, the label can be chosen to identify the topic(s) contained in the cluster or can be an arbitrary string in accordance to a naming convention specified by the user of the message handling system 106. In some implementations, multiple clusters can be related to the same topic or similar topics. For example, two clusters can be related to customer retention: a first cluster can be related to the erroneous charges on customers' billing statements and a second cluster can be related to improper execution of the clients' instructions. These two clusters can both be associated with a label, such as "Customer Retention." The cluster analysis engine 114 can use various algorithms to analyze the resources contained in each cluster and generate a label for the cluster. For example, a term frequency-inverse document frequency algorithm can be applied to determine the word, phrase or combination of feature(s) that have the highest term frequency-inverse document frequency scores and use that feature(s) as the label for each cluster.

In some implementations, a user of the cluster analysis engine 114 can review the clusters generated by the clustering engine 112 and apply a label/descriptor to each cluster. For example, the user of the message handling system 106 can review each message in a cluster or a subset of the messages in a cluster and determine which label should be associated with the cluster.

The cluster analysis engine 114 can analyze the topics/clusters and determine metrics associated with each topic/cluster. For example, the cluster analysis engine 114 can determine the number of messages associated with a topic/cluster versus the number of messages received (i.e. a frequency). In some implementations, the cluster analysis engine 114 can determine the number of messages associated with a topic/cluster versus the number messages received during a specified time period (e.g., three months following a new product/feature introduction). As indicated above, multiple clusters can be associated with a single topic and the cluster analysis engine 114 can determine the number of messages associated with the topic by summing the number of messages in each cluster that have a common label. The cluster analysis engine 114 can determine other types of metric information such as an average time to resolve issues associated with a topic/cluster. For example, the cluster analysis engine 114 can analyze the meta-data associated with each message included in a topic/cluster to determine the date the message was received and the date the message was resolved and calculate an average time for resolution for the topic/cluster.

The cluster analysis engine 114 can also generate a report based on the metrics associated with each topic/cluster. For example, the report can be similar to a spreadsheet and include a column that identifies each topic and a column that indicates the number of messages in each topic and rows that correspond to each label and/or topic.

Figure 2:
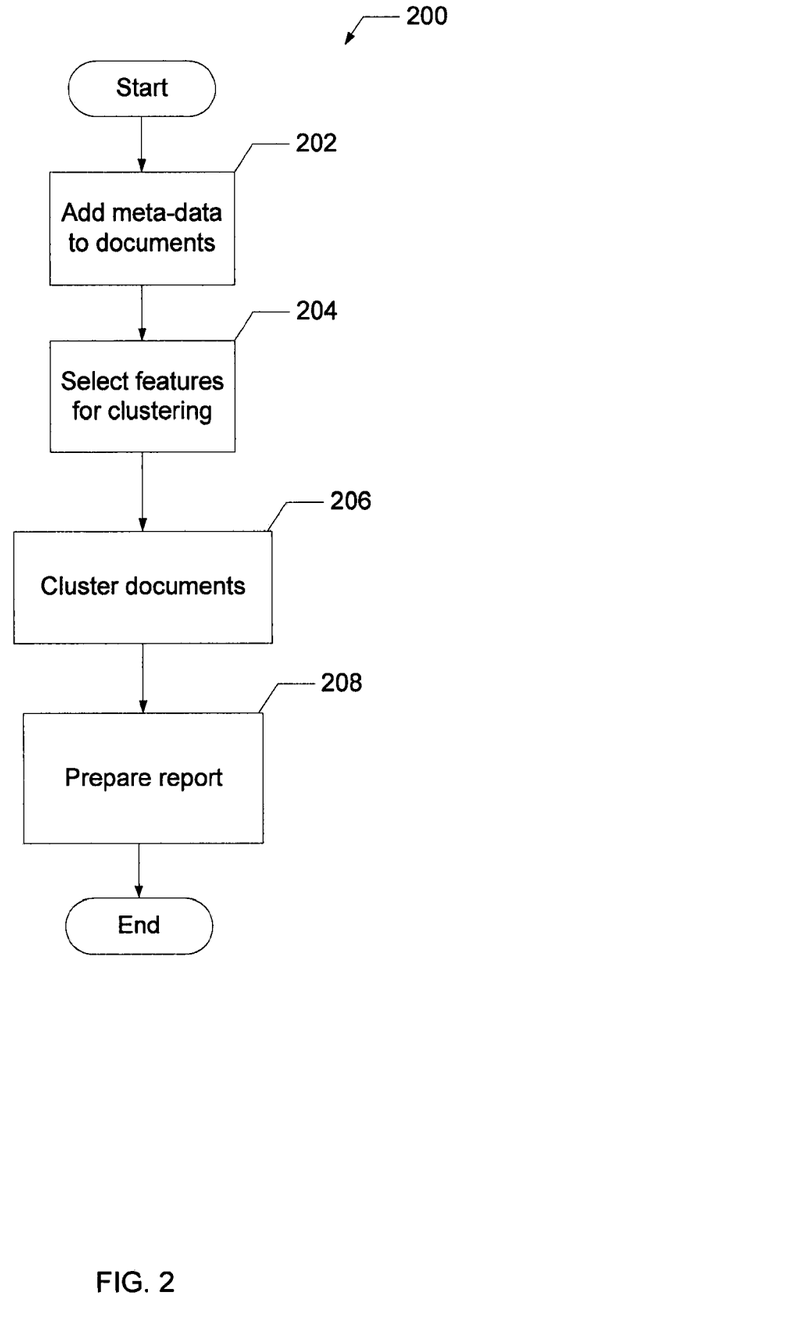
FIG. 2 is a flowchart of an example process for generating a report.

FIG. 2 is a flowchart of an example process 200 for generating a report. The process 200 begins by adding meta-data to a document (stage 202). For example, the message handling system 106 can receive a message through the network 104 and/or a server and the meta-data engine 110 can add meta-data associated with the author/sender, such as the information associated with the identity of the author/sender of the message, recent search queries performed by the author/sender of the message and/or relationship information (e.g., information describing the length of the relationship between the author and the recipient of the message and/or whether the author/sender of a message is a current client or a previous client/customer). In addition, the meta-data engine 110 can add meta-data associated with task flow features, such as information associated with a person or group of persons reviewing or handling a message and/or information associated with the status of the issue described in the message. In some implementations, the meta-data engine 110 can automatically add the task flow meta-data as the message is routed from one entity to another.

The documents are collected and features associated with the documents are selected to be the basis for generating clusters (stage 204). For example, the clustering engine 112 can collect messages from the database of stored messages 108 and identify features, such as the content of the messages and/or meta-data associated with the messages as the basis for forming clusters. In some implementations, the clustering engine 110 can apply a term frequency-inverse document frequency algorithm to determine the features to be used as the basis for generating clusters. In some implementations, the clustering engine 112 can select certain features to be used as the basis for clustering and can cause certain features to be black listed. For example, the clustering engine 112 can identify the author/sender identity information as a black listed feature and can identify task features as features that should be used as a basis for clustering.

At stage 206, the documents are clustered based on the selected features. For example, the clustering engine 112 can use the features selected in stage 204 and cluster the documents based on these features. Various clustering algorithms can be used. For example, a distributed exchange algorithm can be used to cluster the messages and determine the topics included in the clusters. The messages can be clustered based on the selected features and a topic associated with each cluster can be identified. The cluster analysis engine 114 can analyze the messages associated with each cluster and determine a topic associated with the cluster. For example, the cluster analysis engine 114 can apply the term frequency-inverse document frequency algorithm to determine the word, phrase or combination of topic feature(s) that have the highest term frequency-inverse document frequency scores and use the topic feature(s) as the label for each cluster At stage 208, a report is prepared. For example, the cluster analysis engine 114 can prepare a report that includes the labels associated with each cluster and various metric information calculated by the cluster analysis engine 114. The metric information can include metrics such as the number of messages associated with each topic/cluster and/or the average time each message associated with a topic/cluster remained unresolved. In some implementations, the report can be in the form of a spreadsheet. The report can be provided and/or displayed to a user.

Figure 3:
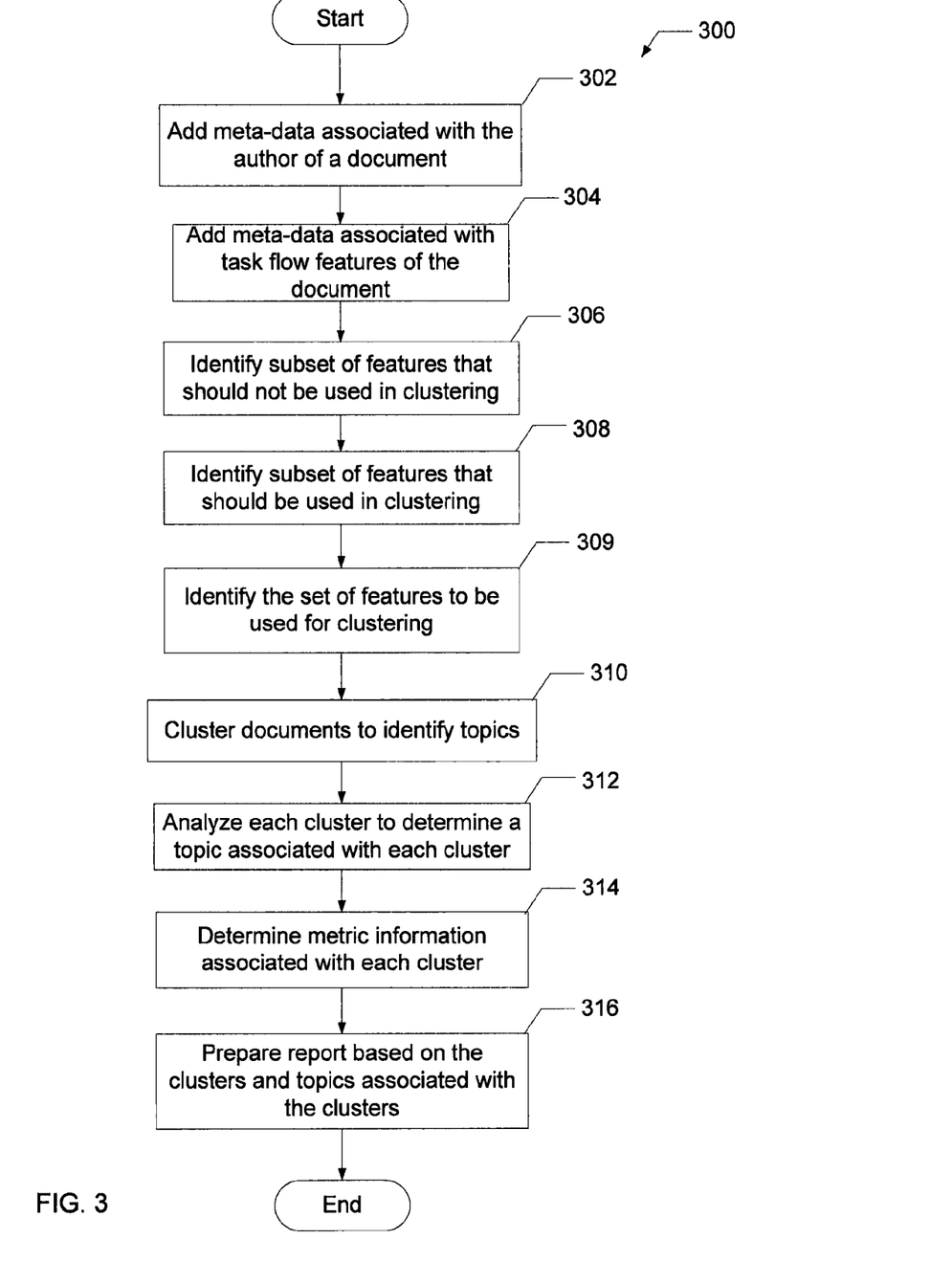
FIG. 3 is a flowchart of an example process for generating a report.

FIG. 3 is a flowchart of an example process 300 for generating a report. The process 300 begins by receiving a document through the network 104 and/or a server and adding meta-data associated with the author of the document to the document (stage 302). For example, the message handler 109 can receive a message 102 and the meta-data engine 112 can add meta-data associated with the identity of the author/sender of the message to the document. In some implementations, the meta-data engine 112 can receive user data associated with the author/sender of the message, such as customer support websites and/or troubleshoot documents the author/sender viewed before sending the message, and/or search queries the author performed before sending the message, which can be added as meta-data. In some implementations, the message handler 109 causes the meta-data engine 110 to automatically add the meta-data associated with the author to the message when the message is received by the message handler 109. In some implementations, a user of the meta-data engine 110 can cause the meta-data engine 110 to add the meta-data associated with the author/sender to the message.

At stage 304, meta-data associated with task flow features is added to the document. For example, the meta-data engine 112 can add meta-data associated with task information (e.g., a product or service that is identified in the message and/or the status of the issue identified in the message), information related to a person or group of persons reviewing or handling the message, and/or a label or keyword associated with the message. In some implementations, the meta-data engine 112 can automatically add the task flow meta-data as the message is routed between entities (e.g., persons or teams assigned to handle issues) identified in the message. In some implementations, a user of the meta-data engine 112 can add the task flow meta-data to the message.

At stage 306, a subset of features is identified as black listed items. For example, a user of the message handling system 106 or the clustering engine 112 can select a subset of the meta-data associated with the authors/senders of the messages, the task flow meta-data and contextual features of the messages as features that should be used as a basis for clustering. In some implementations, the user can select the features that are not to be used for clustering based on the type of clusters the user wishes to generate and/or the type of information the user wishes to gather from the report.

At stage 308, a subset of features is identified that should be used as a basis for clustering. For example, the user of the message handling system 106 or the clustering engine 112 can select a subset of meta-data associated with the messages and the content of the messages as features that should be used as the basis for forming the clusters. In some implementations, the user can select the features that should be used for clustering based on the type of clusters the user wishes to generate and/or the type of information the user wishes to gather from the report.

At stage 309, the set of features that serves as the basis for the clustering algorithm is identified. For example, the clustering engine 110 can select the features to be used as the basis for forming clusters. In some implementations, the term frequency-inverse document frequency algorithm is applied to the messages to determine the features to be used as a basis for the clustering algorithm. The features can include any meta-data associated with the messages and/or the content of messages (e.g., the title of the document and/or numbers, words and/or phrases included in the message). The resulting set of features is modified to include the subset of features identified in stage 308 and to remove the black listed features identified in stage 306. In some implementations, a user of the clustering engine 112 can select the features to be used as a basis for the clustering algorithm.

At stage 310, a set of documents are clustered to identify topics included in the documents. For example, the clustering engine 112 can cluster the messages using various clustering algorithms. In some implementations, the distributed exchange algorithm is used to cluster the messages using the set of features identified as the basis for clustering.

At stage 312, the clusters are analyzed to determine the topic or topics included in the clusters. For example, the cluster analysis engine 114 can analyze the messages (and the associated meta-data) included in a cluster and determine a label/descriptor that identifies the topic associated with the cluster. The cluster analysis engine 114 can associate the label to the cluster. In some implementations, the cluster analysis engine 114 can apply a term frequency-inverse document frequency algorithm to identify the label to be associated with the cluster. In some implementations, multiple clusters will have similar labels or a common label to indicate that the clusters are associated with related topics or the same topic. In some implementations, a cluster can be associated with multiple labels to indicate that the cluster is associated with multiple topics.

At stage 314, the documents associated with each topic/cluster are analyzed to determine metric information associated with each cluster. For example, the cluster analysis engine 114 can determine the number of documents associated with each topic/cluster. In addition, the cluster analysis engine 114 can determine the average amount of time to resolve an issue within a topic/cluster. Other metric information can be calculated.

At stage 316, a report can be prepared based on the topics/clusters and the metric information. For example, the cluster analysis engine 114 can prepare a report that is similar to a spreadsheet. The spreadsheet can include a column that identifies each topic and a column that indicates the number of messages in each topic and rows that correspond to each label and/or topic. In some implementations, the report is provided and/or displayed to a user.

Figure 4:
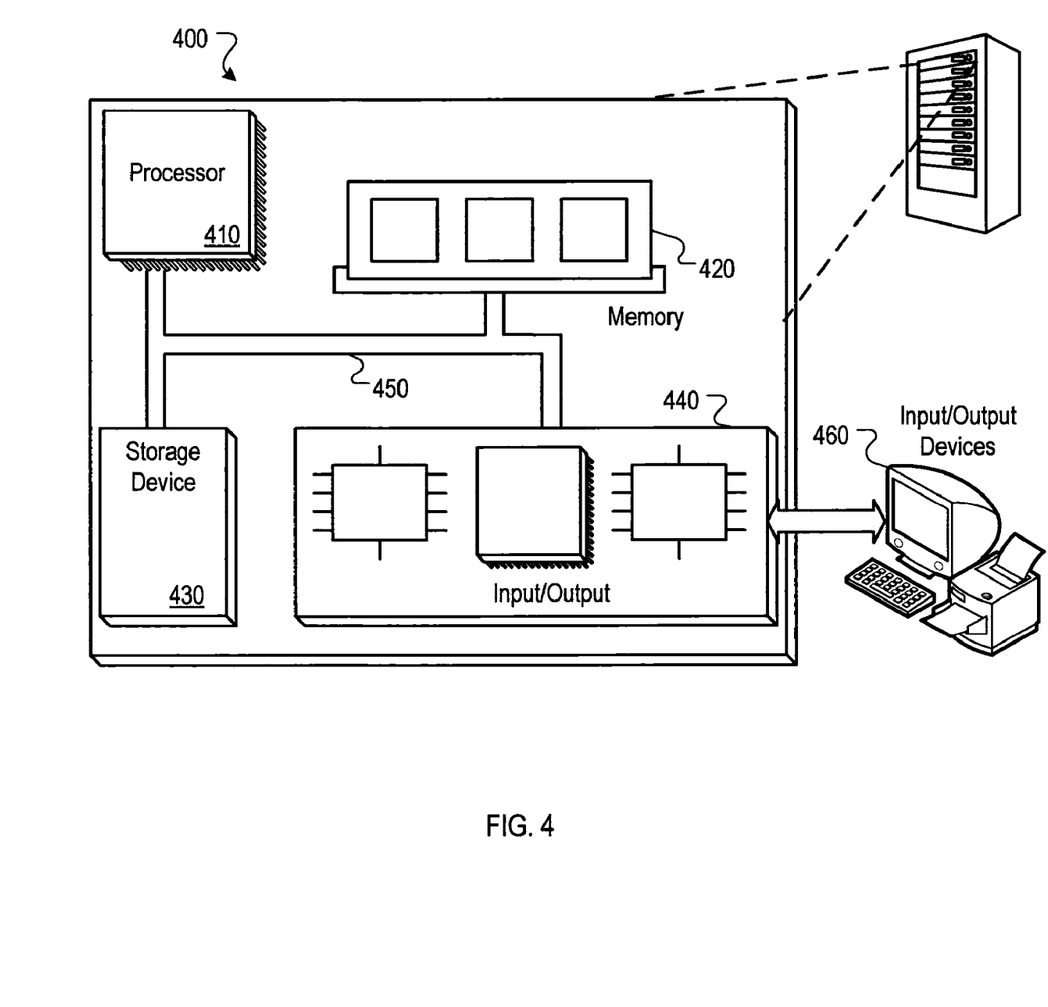
FIG. 4 is a block diagram of an example computer system that can be used to implement the data analysis system.

FIG. 4 is block diagram of an example computer system 400 that can be used to implement the message handling system 106. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

The various functions of the message handling system 106 can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The message handling system 106 can be distributively implemented over a network, such as a server farm, or can be implemented in a single computer device.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, or a combination of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Although a few implementations have been described in detail above, other modifications are possible. Moreover, other mechanisms for clustering resources and preparing reports based on the clusters may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving a plurality of documents through a server;
adding meta-data to each of the plurality of documents, wherein the meta-data added to a particular document comprises task flow features of the particular document;
selecting a plurality of features for use in clustering the plurality of documents, wherein a first subset of features that cannot be selected are identified when selecting the plurality of features, and a second subset of features that are required to be selected are identified when selecting the plurality of features, wherein the plurality of features comprises a subset of the meta-data and a subset of content associated with one or more of the plurality of documents;
clustering the plurality of documents based on the plurality of features including identifying a topic associated with each cluster;
preparing a report based on the clusters and metric information associated with each cluster; and
displaying the report to a user.

2. The computer-implemented method of claim 1 wherein the plurality of documents comprises a plurality of email messages.

3. The computer-implemented method of claim 1 wherein the task flow features of the particular document comprises at least one of data associated with workflow queue information associated with the particular document, task information associated with the particular document and a label associated with the particular document.

4. The computer-implemented method of claim 3 wherein the data associated with workflow queue information comprises data associated with a reviewer that interacted with the particular document.

5. The computer-implemented method of claim 3 wherein the data associated with the task information comprises status information associated with the particular document, information associated with a resolution, date information associated with the particular document and notes associated with the particular document.

6. The computer-implemented method of claim 3 wherein the label associated with the particular document comprises at least one keyword associated with the particular document that is identified by a reviewer.

7. The computer-implemented method of claim 4 wherein the reviewer comprises a customer service representative.

8. The computer-implemented method of claim 1 wherein the meta-data added to a particular document comprises data associated with an author of the particular document, wherein the data associated with the author of the particular document comprises at least one of user data, search queries, relationship data, fiscal information and previous issues associated with the author.

9. The computer-implemented method of claim 8 wherein the user data comprises at least one of information associated with a website previously viewed by the author and information associated with a customer support document previously viewed by the author.

10. The computer-implemented method of claim 1 wherein the report comprises a customer feedback report.

11. The computer-implemented method of claim 1 wherein the plurality of documents comprises messages directed to a customer support service.

12. The computer-implemented method of claim 1 wherein the metric information associated with each cluster comprises at least one of a number of messages associated with each cluster and an average time for resolution.

13. The computer-implemented method of claim 1 further comprising analyzing clusters associated with a particular topic to determine metric information associated with the particular topic.

14. A system comprising:
a database storing a plurality of documents; and
a message handling system coupled to the database and configured to receive a plurality of documents; add meta-data to each of the plurality of documents, wherein the meta-data added to a particular document comprises task flow features of the particular document; select a plurality of features for use in clustering the plurality of documents, wherein a first subset of features that cannot be selected are identified when selecting the plurality of features, and a second subset of features that are required to be selected are identified when selecting the plurality of features, wherein the plurality of features comprises a subset of the meta-data and a subset of content associated with one or more of the plurality of documents; cluster the plurality of documents based on the plurality of features including identifying a topic associated with each cluster; prepare a report based on the clusters and the topic and display the report to a user.

15. The system of claim 14 wherein the plurality of documents comprises a plurality of email messages.

16. The system of claim 14 wherein the task flow features of the particular document comprises at least one of data associated with workflow queue information associated with the particular document, task information associated with the particular document and a label associated with the particular document.

17. The system of claim 14 wherein the meta-data added to a particular document comprises data associated with an author of the particular document, wherein the data associated with the author of the particular document comprises at least one of user data, search queries, relationship data, fiscal information and previous issues associated with the author.

18. The system of claim 16 wherein the data associated with workflow queue information comprises data associated with a reviewer that interacted with the particular document.

19. The system of claim 16 wherein the label associated with the particular document comprises at least one keyword associated with the particular document that is identified by a reviewer.

20. The system of claim 17 wherein the user data comprises at least one of information associated with a website previously viewed by the author and information associated with a customer support document previously viewed by the author.

21. The system of claim 14 wherein the message handling system is further configured to analyze clusters associated with a particular topic to determine metric information associated with the particular topic.

22. A computer readable medium encoded with a computer program comprising instructions that, when executed, operate a computer to perform operations:
receive a plurality of documents;
add meta-data to each of the plurality of documents, wherein the meta-data added to a particular document comprises task flow features of the particular document;
select a plurality of features for use in clustering the plurality of documents, wherein a first subset of features that cannot be selected are identified when selecting the plurality of features, and a second subset of features that are required to be selected are identified when selecting the plurality of features, wherein the plurality of features comprises a subset of the meta-data and a subset of content associated with one or more of the plurality of documents
cluster the plurality of documents based on the plurality of features including identifying a topic associated with each cluster;
prepare a report based on the clusters and the topic; and
display the report to a user.

23. The computer readable medium of claim 22 wherein the plurality of documents comprises a plurality of email messages.

24. The computer readable medium of claim 22 wherein the task flow features of the particular document comprises at least one of data associated with workflow queue information associated with the particular document, task information associated with the particular document and a label associated with the particular document.

25. The computer readable medium of claim 22 wherein the meta-data added to a particular document comprises data associated with an author of the particular document, wherein the data associated with the author of the particular document comprises at least one of user data, search queries, relationship data, fiscal information and previous issues associated with the author.

26. The computer readable medium of claim 25 wherein the user data comprises at least one of information associated with a website previously viewed by the author and information associated with a customer support document previously viewed by the author.

27. The computer readable medium of claim 22 comprising instructions that, when executed, operate a computer to perform operations:
analyze clusters associated with a particular topic to determine metric information associated with the particular topic.

* * * * *